United States Patent
Sabounjian

[19]

[11] Patent Number: 6,032,965
[45] Date of Patent: Mar. 7, 2000

[54] STACKING MODULAR STORAGE UNITS WITH FLEXIBLE CONTAINERS

[75] Inventor: Azad Sabounjian, Anaheim, Calif.

[73] Assignee: Pro-Mart Industries, Inc., Rancho Cucamonga, Calif.

[21] Appl. No.: 08/781,872

[22] Filed: Jan. 10, 1997

[51] Int. Cl.[7] .................. B62B 3/02; B62B 3/08
[52] U.S. Cl. ............. 280/47.35; 280/644; 280/651; 280/654
[58] Field of Search ................ 280/47.35, 644, 280/649, 651, 654, 47.19, 47.26, 47.33, 79.2, 79.3, 79.7; 220/23.83, 909, 480, 23.2, 23.4; 211/126.12, 126.15, 85.24; 209/702, 703, 942

[56] References Cited

U.S. PATENT DOCUMENTS

| | | | |
|---|---|---|---|
| D. 396,923 | 8/1998 | Moore | D34/24 |
| 681,098 | 8/1901 | Brown | 211/133.1 |
| 957,652 | 5/1910 | Bush | 280/47.35 |
| 1,097,163 | 5/1914 | Brown | 280/47.35 |
| 1,562,089 | 11/1925 | Holley | 280/47.35 |
| 1,820,466 | 8/1931 | Lieblein | 280/79.2 |
| 1,837,664 | 12/1931 | Longan | 280/79.2 |
| 2,133,834 | 10/1938 | Sheldon | 280/47.35 |
| 2,582,435 | 1/1952 | Howard | 280/47.35 |
| 2,664,141 | 12/1953 | Musselman | 280/79.2 |
| 2,687,589 | 8/1954 | Brockway | 280/79.2 |
| 2,782,047 | 2/1957 | Moran | 280/654 |
| 2,798,651 | 7/1957 | Wasyluk | 280/47.19 |
| 2,819,938 | 1/1958 | Zerver | 312/201 |
| 2,904,237 | 9/1959 | Wasyluk | 280/47.35 |
| 3,743,122 | 7/1973 | Fortriede | 214/44 R |
| 3,955,681 | 5/1976 | DeZinno . | |
| 4,094,526 | 6/1978 | Clarke et al. | 280/47.35 |
| 4,161,252 | 7/1979 | Howells . | |
| 4,165,088 | 8/1979 | Nelson | 280/47.35 |
| 4,369,987 | 1/1983 | Witherell | 280/644 |
| 4,441,615 | 4/1984 | Goodrich . | |
| 4,466,628 | 8/1984 | Zerver | 280/47.35 |
| 4,480,756 | 11/1984 | Belokin, Jr. . | |
| 4,530,510 | 7/1985 | Driggers | 280/47.17 |
| 4,620,637 | 11/1986 | Karashima | 211/188 |
| 4,795,040 | 1/1989 | Lopez . | |
| 4,795,186 | 1/1989 | Tyus | 280/651 |
| 4,901,872 | 2/1990 | Lang . | |
| 4,911,303 | 3/1990 | Andersson . | |
| 4,953,879 | 9/1990 | Cain et al. | 280/47.19 |
| 4,955,488 | 9/1990 | Nicoll . | |
| 4,984,704 | 1/1991 | O'Malley | 220/23.4 |
| 4,998,023 | 3/1991 | Kitts . | |
| 5,090,725 | 2/1992 | Felder | 280/651 |
| 5,190,305 | 3/1993 | Putman | 280/79.3 |
| 5,203,815 | 4/1993 | Miller | 43/21.2 |
| 5,213,360 | 5/1993 | Liu | 280/648 |
| 5,294,009 | 3/1994 | Maurer et al. . | |
| 5,324,054 | 6/1994 | Kleier | 280/79.2 |
| 5,411,153 | 5/1995 | Unfried . | |
| 5,427,394 | 6/1995 | Lauto | 280/47.35 |
| 5,445,397 | 8/1995 | Evans | 280/47.18 |
| 5,458,243 | 10/1995 | McBride . | |

(List continued on next page.)

Primary Examiner—Eric Culbreth
Assistant Examiner—Bridget Avery
Attorney, Agent, or Firm—Knobbe, Martens, Olson & Bear, LLP

[57] ABSTRACT

A modular stacking storage unit with flexible containers is disclosed. The storage unit includes a rigid outer frame comprising a base section, vertical members rising from each corner of the base section, and a plurality of front and back support members. Each storage container or receptacle has flexible material supported between the front and back support members. The front support member is lower then rear support member to increase access to the storage container when multiple modules are stacked. The container has a wider top and a narrower bottom to taper the container and further improve access to a lower container. The top end of each vertical member of each module is shaped to mate with either the bottom end of the vertical members of another container module, a top member, or a support for a clothes bar. The base section has wheels to increase the mobility of the storage unit.

33 Claims, 8 Drawing Sheets

U.S. PATENT DOCUMENTS

| | | | |
|---|---|---|---|
| 5,464,104 | 11/1995 | McArthur . | |
| 5,531,464 | 7/1996 | Maurer et al. | 280/47.35 |
| 5,544,781 | 8/1996 | Mattesky | 220/404 |
| 5,595,395 | 1/1997 | Wilson | 280/47.26 |
| 5,695,205 | 12/1997 | Liu | 280/79.2 |
| 5,758,886 | 6/1998 | Mayer | 280/47.26 |
| 5,772,236 | 6/1998 | Clark | 280/651 |

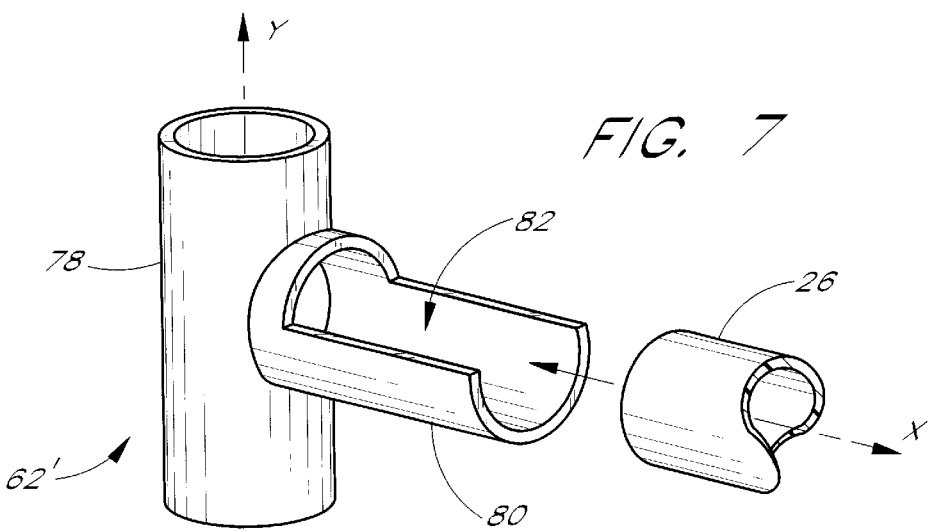
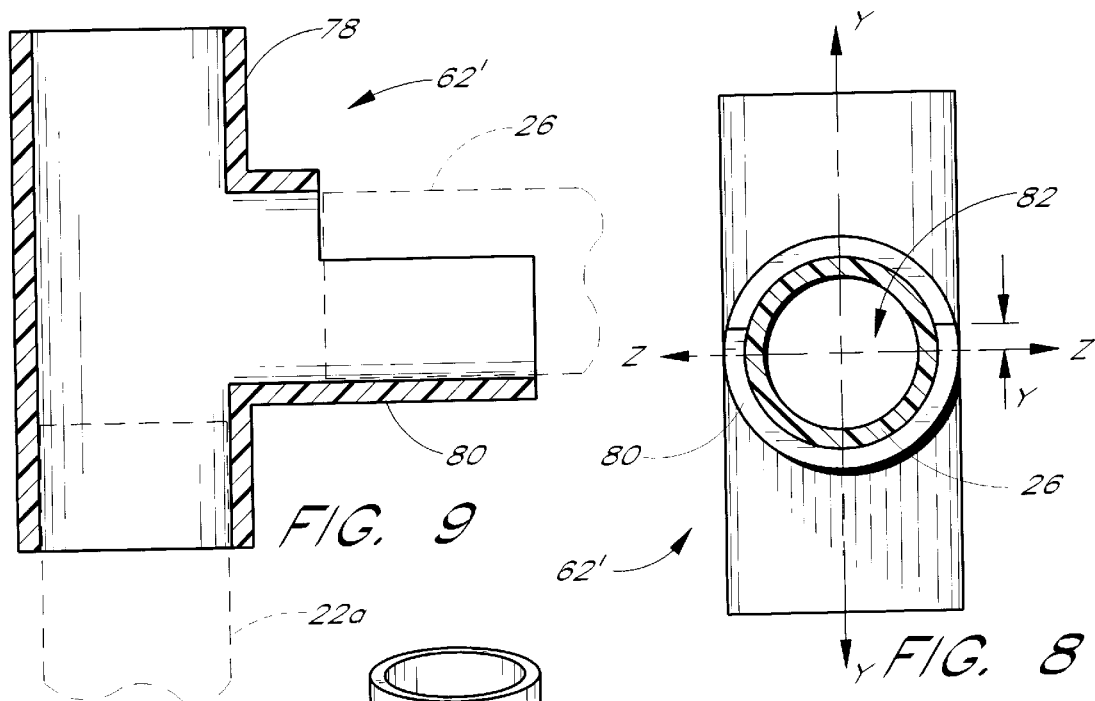
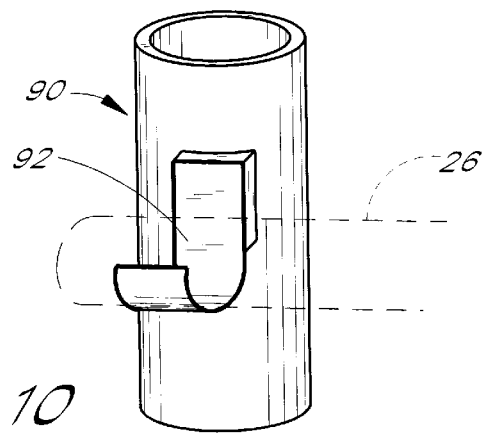

6,032,965

STACKING MODULAR STORAGE UNITS WITH FLEXIBLE CONTAINERS

FIELD OF THE INVENTION

The present invention relates to stacked storage containers having a supporting frame for containers made of fabric or flexible material, and in particular this invention relates to a stackable storage container for clothes.

BACKGROUND OF THE INVENTION

Various types of storage containers exist for temporarily storing and transporting items. Stacked containers store produce, machine parts, fasteners, toys clothes and various other items. The stored items, such as clothing or laundry, are loaded into containers so that the clothing or laundry can be temporarily stored or transported to a different location. Multiple bins are often used to sort the clothing or laundry, or to sort and separate other temporarily stored parts.

Many problems exist with the design of prior storage containers. For example, prior designs fix the containers in a single configuration thereby preventing a worker from configuring the containers to meet the needs of each individual application.

Another drawback of prior storage containers is that they are either constructed of flimsy material that can not support heavy loads, or if constructed of more substantial material, become excessively heavy, especially when loaded. But loaded hampers constructed of heavy material are difficult to move.

Furthermore, prior storage containers have receptacles constructed of rigid material, such as sheet metal. This type of construction prevents air from circulating within and through the container. When storing damp or wet items, this type of construction is a serious drawback because under these conditions mildew, mold and bacteria thrive and multiple.

Finally, the design of prior containers placed one container on top of another with little clearance between the bottom of an upper receptacle and the top edge of a lower receptacle. This design makes access to each receptacle difficult, or results in excessively high stacks if ample access room is provided.

It is the object of the present invention to overcome the problems and limitations found in stacked containers, bins or hampers of the prior art.

SUMMARY OF THE INVENTION

A storage unit having a first frame with a first and second, generally parallel supports spaced a distance apart in a horizontal plane and offset a distance in a vertical plane so the first support is lower than the second support. A first container is supported between these supports. Preferably, the container is formed from a flexible panel extending between the first and second supports to form a first container. The container typically has sides, but not necessarily so. If desired, the first frame may be rollably supported on wheels so the storage unit may be easily moved.

A second storage container is mounted on the top of the first storage container. There is thus provided a second frame, having third and fourth, generally parallel supports spaced a distance apart in a horizontal plane and offset a distance in a vertical plane so the third support is lower than the fourth support. A second container is supported by the third and fourth supports. Preferably, a flexible panel extends between the third and fourth supports to form the second container. The second frame rests on the top of the first container, with connectors attaching the first and second frame. The second container may be tapered such that a top of the container is wider than a bottom of the container to improve access to the lower, first container located below the second container.

There is thus advantageously provided first frame means for supporting a first container between a first and second support that are offset in the vertical direction to improve access to the container, and second frame means for supporting a second container between a third and fourth support that are offset in the vertical direction to allow access to the second container, the second frame means being located above, and connected to and supported by the first frame means.

Preferably, the storage unit comprises a quadrilateral base mounted on rollers. Onto this base is mounted a rectangular, tubular first frame having a first and second, generally parallel supports spaced a distance apart in a horizontal plane and offset a distance in a vertical plane so the first support is lower than the second support. The first container extends between the first and second supports. Onto this first frame is mounted a second frame that has third and fourth, generally parallel supports spaced a distance apart in a horizontal plane and offset a distance in a vertical plane so the third support is lower than the fourth support. A second container extends between the third and fourth supports. The second frame rests on the top of the first frame.

Advantageously, the amount by which the container supports are vertically offset is selected to allow suitable access to the container. A plurality of stackable containers may be stacked vertically with connectors at a plurality of the members connecting the frame or supports holding the containers.

There is also provided a method of stacking storage containers, comprising the steps of forming a first support frame that supports a front and rear member that are generally horizontal, with the front member being vertically lower than the rear member. The first container is supported between the front and rear members, with the vertical distance between the front and rear members being selected to allow suitable access to the first container when another storage container is stacked on top of the first support frame. A second support frame is formed that supports a second front and second rear member that are generally horizontal, with the second front member being vertically lower than the second rear member. A second container is supported between the second front and second rear members, with the vertical distance between the second front and second rear members being selected to allow suitable access to the second container when another storage container is stacked on top of the second support frame. The second frame is placed above the first frame and connects the frames to form a self-supporting storage unit.

When the desired number of storage modules have been stacked, a top member connects the distal ends of the support frame to provide a stabilizing connection, and to provide a handle to help move the storage unit. A clothes bar may have one end connected to the support frame, with the other end of the bar supported so the bar is in a generally horizontal position.

There is thus provided a method of making a storage unit by forming a plurality of vertically stacked storage modules. The storage modules are assembled from non-metallic, tubular pipe using at least one pipe connector to join the tubular pipe. Advantageously, at least one of the modules comprises a generally rectangular frame having at least two generally parallel support members separated by a vertical and horizontal distance and a flexible container suspended therebetween. The modules are stacked vertically by connecting a plurality of frame members of each module to corresponding frame members of an adjacent module with a connector. Preferably the flexible container is formed so that a top of the container is wider than a bottom of the container to increase access to the container immediately below. Further, a clothes bar may be provided by connecting one end of a bar to one of the frames, and connecting the other end to one of a support or a frame to hold the bar generally horizontal.

Further objects, features, and advantages of the present invention over the prior art will become apparent from the detailed description of the drawings which follows, when considered with the attached figures.

BRIEF DESCRIPTION OF THE DRAWINGS

FIG. 7 is a perspective view of a further alternate embodiment of a connector for the storage unit of this invention.

FIG. 8 is a cross sectional view of the connector of FIG. 7.

FIG. 9 is a side view of the connector of FIG. 7.

FIG. 10 is a perspective view of a further alternate embodiment of a connector for the storage unit of this invention.

DETAILED DESCRIPTION

Figure 1A:
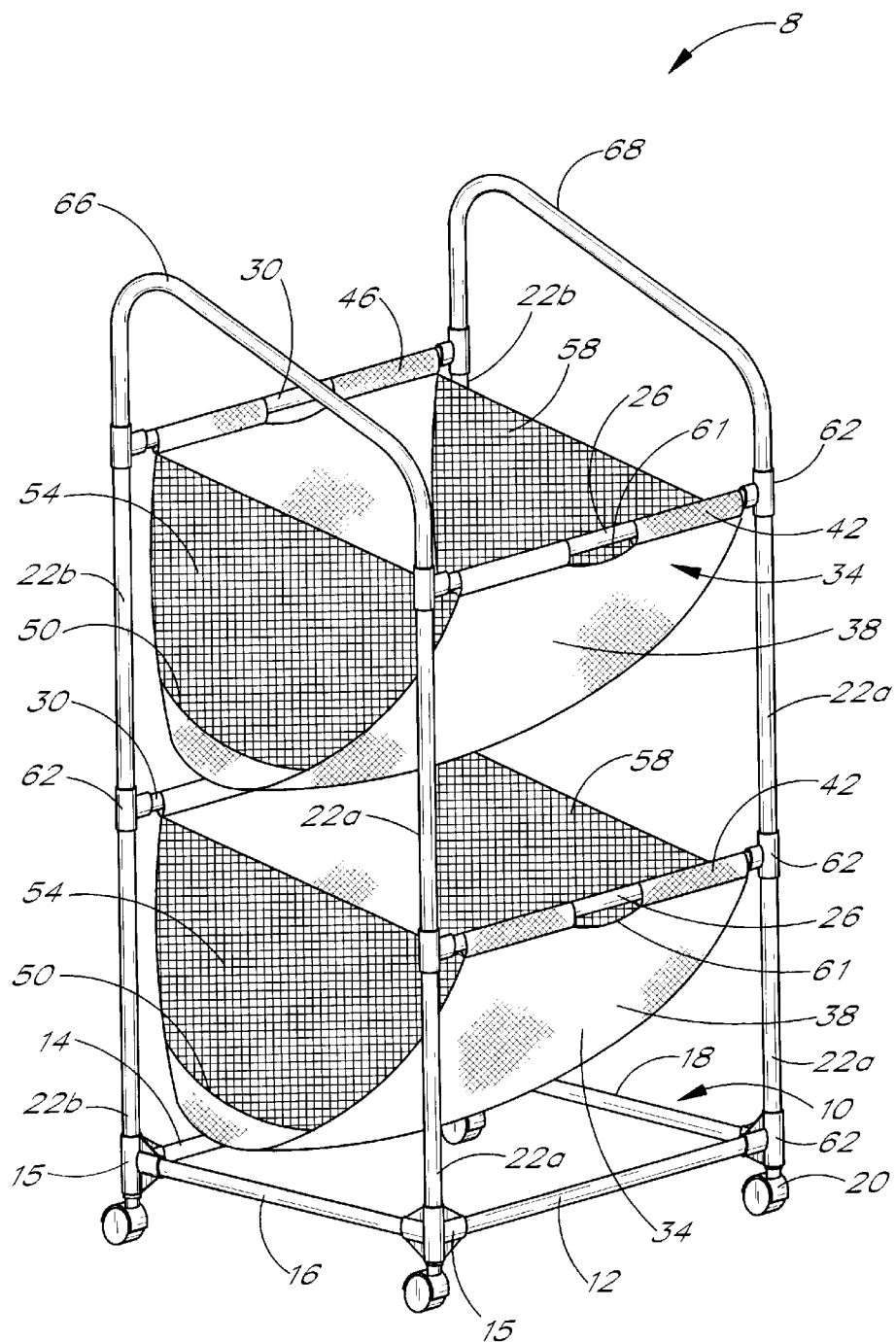
FIG. 1A is a perspective view of two modules of the storage unit.

FIG. 1 illustrates a storage unit 8 with a rectangular base 10. As used here, the front or forward direction refers to the front of the storage unit 8 commonly accessible to users of the storage unit. The rear direction refers to the opposite direction and to the portion of the storage unit that is typically placed against a wall. The upper direction or top refers to the direction away from the floor on which the storage unit rests, and the downward direction or bottom refers to the direction toward the floor or to the direction of gravity.

The base 10 has front and back members 12 and 14 that extend generally parallel to one another, and preferably are generally horizontal. Side members 16, 18, respectively extend generally parallel to each other and connect opposing ends of the front and back members 12, 14 through use of a connector 15. The side members 16, 18 are generally perpendicular to the front and back members 12, 14, to form the generally rectangular base 10 that lies in a common plane. A rollable support, such as wheel 20, is connected to the bottom of each corner of the rectangular base, interposed between the base and the floor, to increase the mobility of the storage unit 8. A wheel, caster, or rotating ball is used for the wheel 20, but other rolling or rotating devices can be used. Advantageously the wheels 20 also connect to the base 10 through the connectors 15.

The connectors 15 advantageously comprise tubular connectors, and in the depicted configuration have four openings. Two of the openings in connector 15 are axially aligned with the vertical axis, one to connect to wheels 15, and one to connect to tube 22 as described later. The other two openings of connector 15 are at substantially right angles to one another to connect one of side members 16, 18 to back member 14 or to front member 16.

Mounted onto the base 10 are one or more storage modules 21 each of which preferably comprises a series of supports and containers as described herein. Extending orthogonally upward from the plane of the base 10, and from each corner of the base 10 is a vertical member 22. Preferably the vertical members 22 comprise two front members 22a and two rear members 22b. A lower end of the members 22 connects to connector 15 on base 10.

A front, traverse support member 26 extends between the upper ends of front support members 22a. Advantageously the front member 26 is located and positioned above and generally parallel to the front base member 12. A rear, traverse support member 30 extends between the upper ends of rear support members 22b. Advantageously the rear member 30 is located and positioned above and generally parallel to the rear base member 14. Thus, the members 26, 30 are generally parallel, and preferably generally horizontal, but spaced apart in a horizontal plane.

The front member 26 is lower than the rear member 30. This is advantageously achieved by making the front vertical supports 22a shorter than the rear supports 22b. It is believed possible, but less preferable, that the supports 22a and 22b could be of equal length with the front support 26 mounted to the front supports 22a at a distance from the end of the supports 22a.

Suspended between the front support member 26 and rear support member 30 is a container 34. While the container 34 can be made of rigid material like sheet plastic or metal, the container 34 is advantageously comprised of flexible material, including, but not limited to, fabric, mesh or netting. The container 34 may take various shapes, but is advantageously comprised of a main panel 38, a first side panel 54, and a second side panel 58. The main panel is generally rectangular in shape having a front edge 42, a rear edge 46, and two side edges 50.

A first side panel 54 and second side panel 58 attach to the main panel side edges 50 to form the container 34. The side panels 54, 58 preferably have a wider top than bottom, and are preferably attached by sewing, although other methods of attaching the panels could be used, including, but not limited to, riveting, gluing, heat bonding, zipping, snapping, or weaving. Depending on the particular application, the side panels 54, 58 may take various shapes and enclose various portions of the sides of container 34. In some applications it may be desirable to have no side panels 54, 58 for the container 34, and preferably the side panels 54, 58 do not enclose the entire side of the container 34, but leave a slight opening at the bottom of the container 34. In appropriate situations an open mesh fabric may be used for the side panels 54, 58 to enhance air circulation. For other uses a solid fabric enclosing the entire sides of container 34 may be desired. The construction of the container 34 can thus vary to suit the particular application.

Once attached to the supports 26, 30, the main panel 38 forms a downwardly sloping "U" shape, with the top rear end of the "U" being higher then the top front end of the "U". The main panel front edge 42 connects to the front support member 26 and the main panel rear edge 46 connects to the rear support member 30. Preferably, the main panel 38 is attached by forming a loop at the front and rear edges of the panel 38, by looping the front and rear edges of the material back toward the body of the panel 38 and then securing the edges to the panel body. The front support member 26 and rear support member 30 are slid through the cylindrical opening in the respective front and rear ends of the main panel. Advantageously the loop is not continuous, but contains a cut-out portion 61 in the front edge 42 of panel 38, so that the front support 26 may be grabbed directly by hand.

The front support 26 being lower than the rear support 30 tilts the opening for the container 34 toward the front of the storage unit 8 to permit easier access to the interior of the container 34. Advantageously the vertical offset between the front and rear supports 26, 30, respectively, is sufficient to allow suitable access to the container 34 when another storage module 21 is located above the container to which access is desired.

There is thus provided a self-supporting, storage module 21 comprising vertical supports 22 connected by front and back supports 26, 30, with a flexible container 34 suspended between the supports 26, 30. The supports 22, 26, 30 comprise the support structure for a stackable module 21, with the module 21 just described being connected to the base 10 through connectors 15. Additional module structures may be stacked vertically on the base 10 as described hereinafter, with the resulting storage unit being self-supporting or free-standing. As desired for structural stability, suitable bracing supports may connect the front and rear vertical supports 22a, 22b, or connect front and rear transverse supports 26, 30.

Figure 1B:
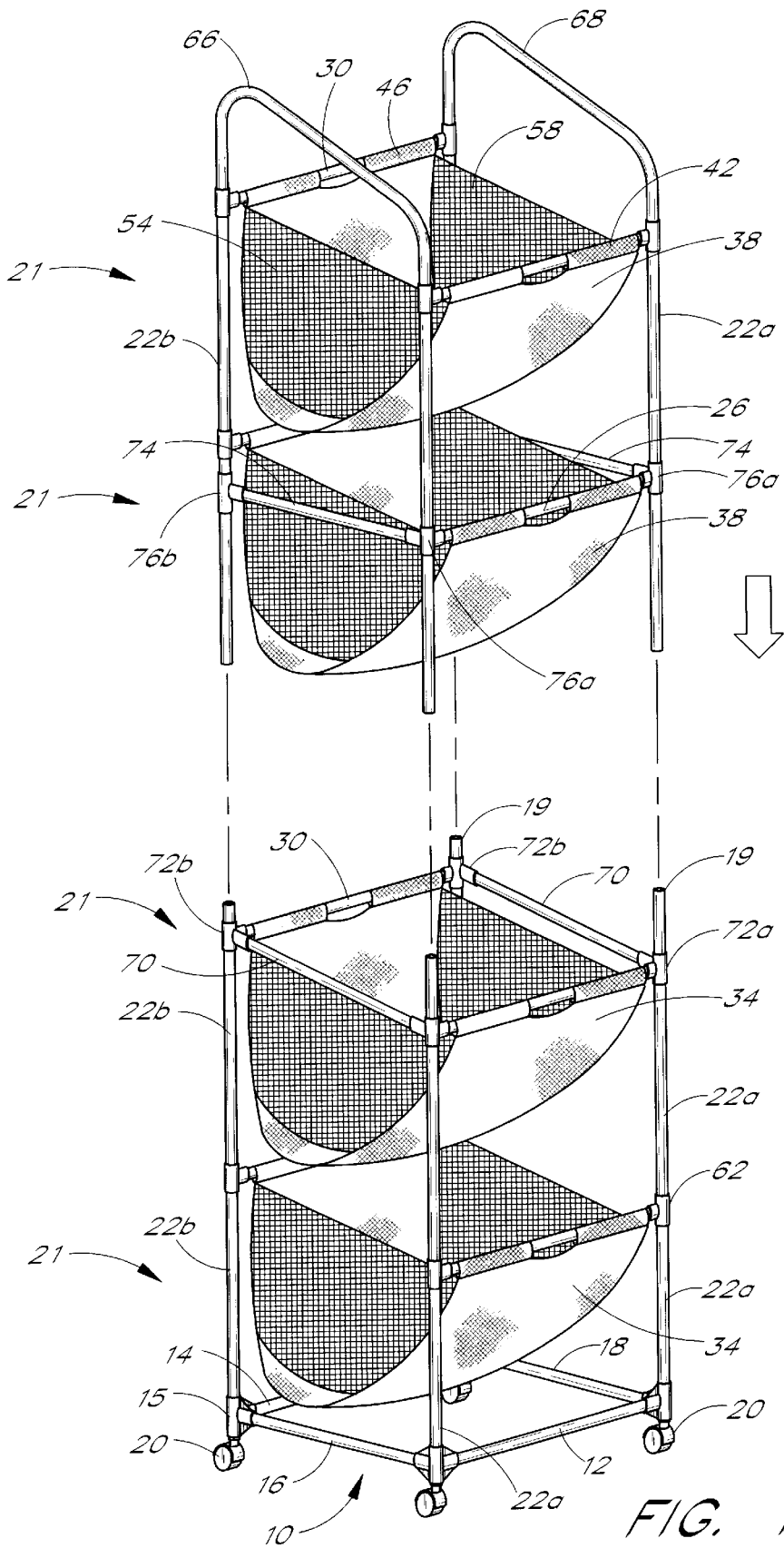
FIG. 1B is an exploded perspective view of two storage modules stacked in a vertical arrangement.
Figure 2:
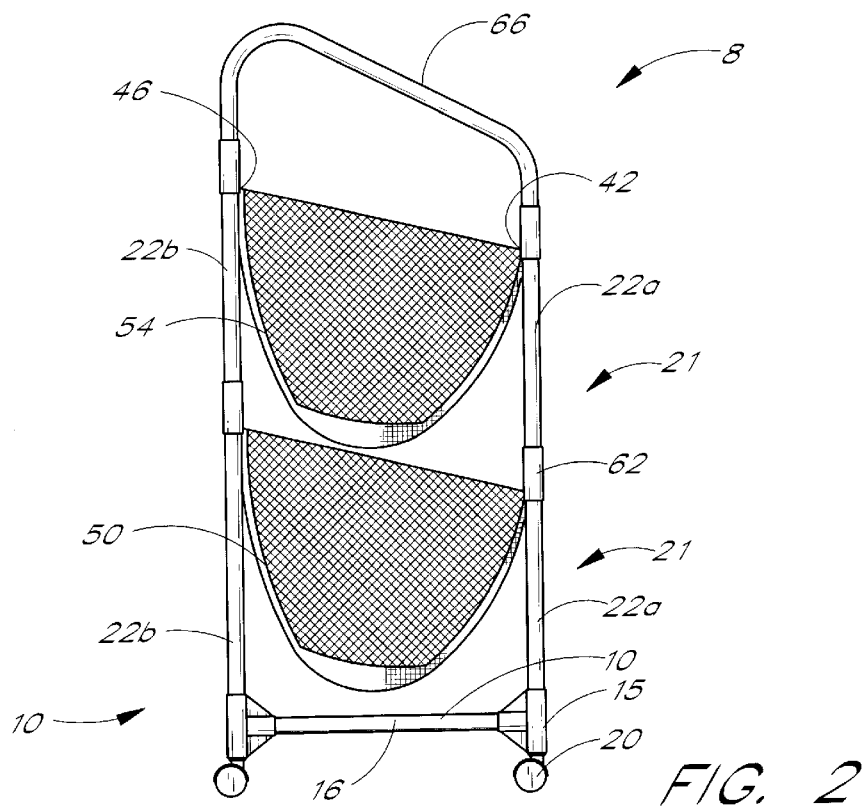
FIG. 2 is a side plan view of two stacked storage modules.
Figure 3:
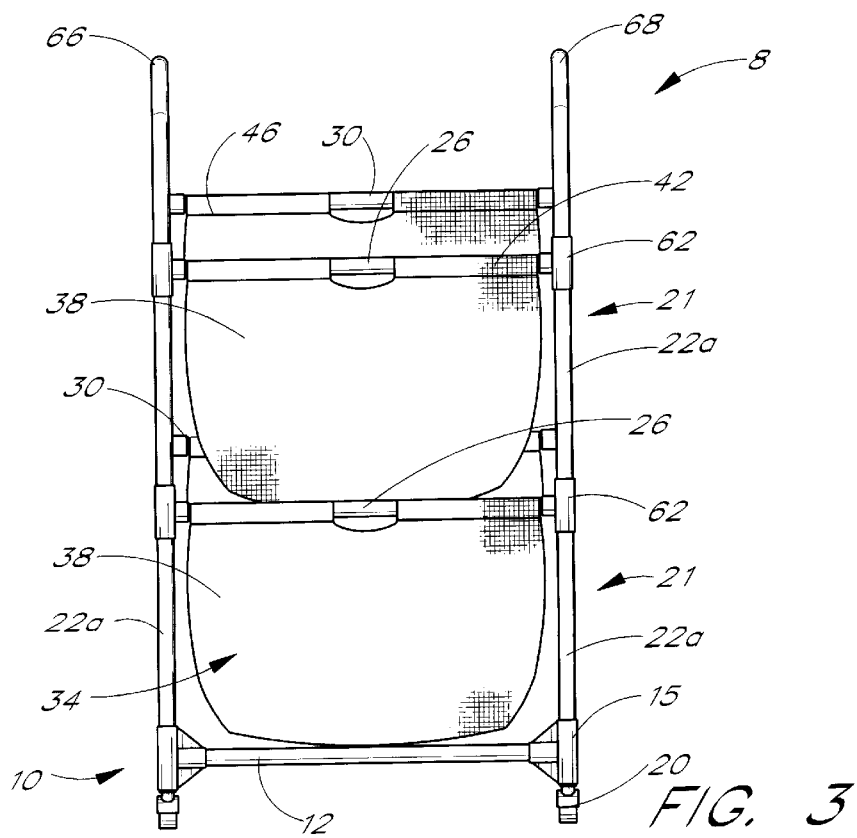
FIG. 3 is a front plan view of two stacked storage modules.
Figure 4:
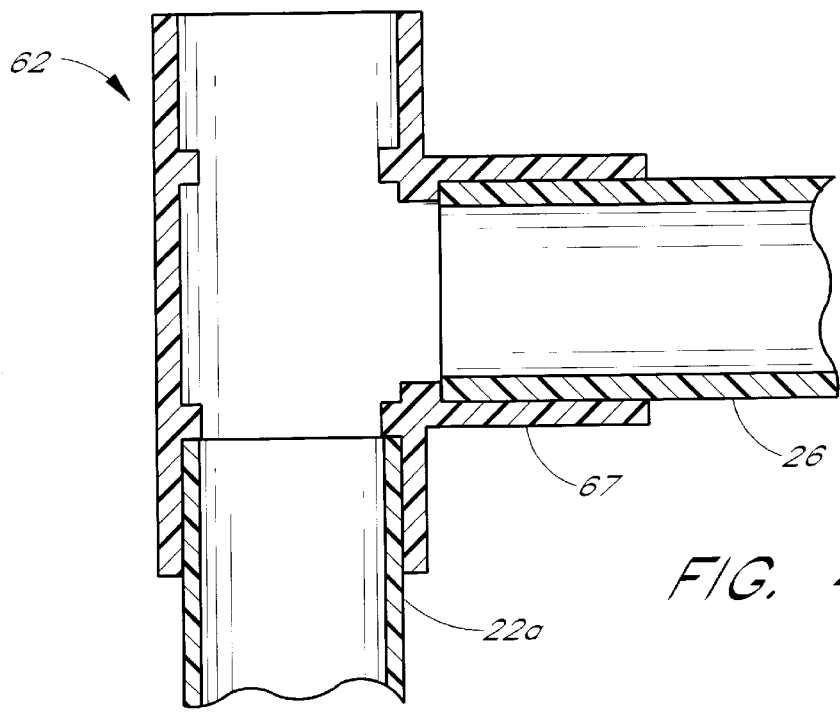
FIG. 4 is a cross sectional view of a first embodiment of a connector for the storage unit of this invention.

Referring to FIGS. 1–4, an upper end of each support member 22b is connected to the lower or bottom end of vertical members of another module, preferably through use of a connector 62, so that one module may be stacked on top of another module to form a configuration of desired height. FIGS. 1–3 show two storage modules 21 stacked vertically, while FIG. 4 shows four modules 21 stacked vertically.

At the top of the storage unit 8 is a first top member 66 extending from the top of one rear vertical member 22b to the top of the vertical member 22a on the same side of the storage unit 8. A second top member 68 extends from the top of the other rear vertical member 22b to the top of the vertical member 22a on the same side of the storage unit 8. The top members 66, 68 increase the structural integrity of the frame and provide a push handle to move the storage unit. Alternatively, given the present disclosure, the top members 66, 68 could be constructed and connected in various ways to improve the stability of the storage unit 8.

The present storage unit 8 offers several advantages in addition to those mentioned above. When more than one storage modules 21 are stacked vertically, the vertical offset between the front and rear supports 21, 30, respectively, helps create an opening allowing suitable access to the contents of the lower container 34. Thus, the rear support member 30 is advantageously positioned vertically higher then the front support member 26 to increase access to the receptacle 34, and to especially increase access to the lower of two receptacles 34 stacked vertically. The amount of offset between the front support member 26 and rear support member 30 can be varied as desired to increase or decrease the amount of access depending on the type of item intended to be stored in the container 34. For items smaller than a persons hand, like nuts, washers and screws, an offset sufficient to allow passage of the hand may suffice. For items that are flexible or compressible and may be held by hand, such as clothing, an offset sufficient to allow easy passage of a person's hand may suffice, but larger spacings may be more desirable. For large items, such as food products like melons, a larger opening may be desired.

FIG. 2 illustrates the height of the front support member 26 in relation to the rear support member 30. The vertical displacement of the front support 26 relative to the rear support 36 is preferably selected to correspond to the smallest dimension of items that are to be stored in the container 34. Usually the displacement distance is not less than a distance which allows a person's hand to be inserted, although the distance could be less if a tool is used to remove items from the container 34. The particular size of the storage modules 21, containers 24, and supports 22, 26, 30, will vary with the desired use of the storage modules 21. Thus, depending on the use there could be several vertically stacked storage modules 21, there could be just a few, or there could only be one module 21.

Additional strengthening members may be added as needed to stabilize the storage unit 8 as the height increases, as shown in FIG. 1B. These strengthening members may take the form of inclined side supports 70 extending between connectors 72a on the front of the storage unit 8 and the connectors 72b at the rear of the unit 8. Because the depicted connectors 72a, 72b also connect the front and rear supports 26, 30, respectively, the connectors 72a, 72b must be four way connectors with four openings. Because the supports 26, 30 are vertically offset, the connectors 72a, 72b have to have one opening angled to accommodate the offset.

Alternatively, generally horizontal side supports 74 could be used with front and rear connectors 76a, 76b, respectively, comprising a four way connector with two openings that are axially and vertically aligned, and two lateral openings one of which is aligned with the generally horizontal side support 25 and the other of which is aligned with the front support 26. The connectors 76a, 76b would have the same general construction as connector 15. The length of legs 22 connecting to the vertical openings in connectors 76b would be shortened to ensure the rear support 30 was at the appropriate height relative to the front support 26. Given the present disclosure, one of ordinary skill in the art could devise other suitable strengthening members and connections without undue experimentation.

For ease of access to stacked containers 34, it is also preferred that the top of the container 34 be wider than the bottom. Thus, the side panels 54 at the top, or opening of the container 34 are substantially as wide as the distance between supports 22a, 22b. But the bottom of the container 34 is not as wide as the top, giving the side panels 54 a generally trapezoidal or triangular shape. Having the top wider than the bottom allows the front portion of the container 34 to taper rearward toward the bottom of the container 34. Making the bottom of the container 34 narrower in width allows increased access to a storage container 34 when there is another container 34 stacked above it. Preferably the bottom of the container 34 is about half to three-quarters as wide as the top, although the width differential can be varied depending on how much access is needed the container 34 below, or depending on the size of the articles intended to be stored in the container 34. The stacked containers 34 need not be identical, but can be of various sizes and construction depending on the particular needs.

The tapered containers 34 and the lowering of the front support 21 to tilt the opening forward, each contributes to improved access to the interior of the container 34, and cooperate to improve that access. Advantageously the top-front opening of container 34 is more forward than the bottom of the container, causing a slight tilt of the container that makes it easier to access the opening of the container.

The base 10 provides a stable support for the remainder of the storage unit 8, and allows easy connection of wheels 20 to make it easier to move the storage unit 8. Given the present disclosure, other suitable bases can be provided, or the remainder of the storage unit 8 can be designed to be sufficiently strong and stable so that no base is needed and the wheels may be connected directly to the bottom of the lowest vertical supports 22a, 22b. For some uses the wheels 20 may not be needed, and may be omitted.

Advantageously, base 10 and the supports 22, 26, 28, and top members 66, 68 are formed of tubes, preferably PVC tubing. Molded or blown plastic, metal, wood, carbon fiber or other similar material could be used for the support structures. Pipes or tubes are preferred because of their high strength and low weight advantages, but other shapes could be used, including solid rods, angled shaft or a combination thereof.

Many methods and devices exist for attaching one member to another, but advantageously the connectors 15, 62 allow a simple, quick and consistent method of connection. The connector 62 advantageously comprises a plastic pipe fitting made of PVC tubing. A "T" connector may be used for the connectors 62 joining supports 22a, 22b of modules 21. A four way connector with one straight tube and two laterally extending tubes spaced ninety degrees apart may be used for forming the base 10 and connecting the base 10 to the bottom ends of support members 22a, 22b. These connectors 62 are commercially available. Given the present disclosure, one skilled in the art could devise other suitable connectors. The previously described connector 15 can also be made of PVC tubing or specially cast of the same or similar material.

Figure 5:
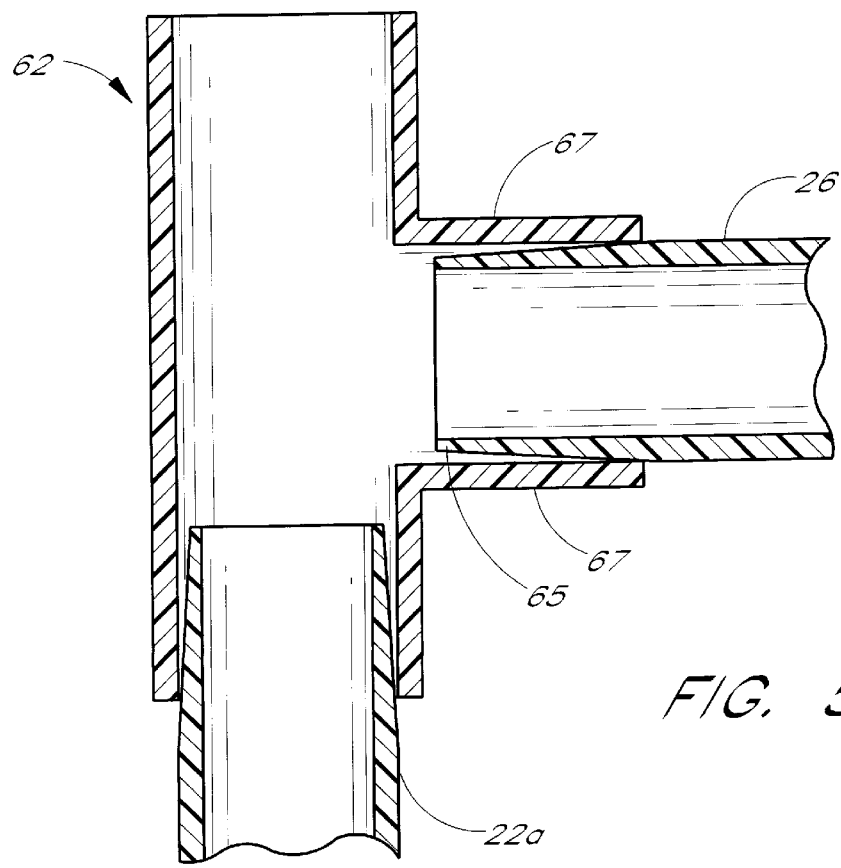
FIG. 5 is a cross sectional view of an alternative embodiment of a connector.

Advantageously, the ends of members 22, 26, 30, 66, 68 are sized to engage the tubular projections of the connectors 15, 62 as shown in more detail in FIGS. 4–5. The connection will be described relative to one support member 22, it being understood that the same connection can be used for the other support members 26, 30 and top members 66, 68. One end of a support member 22a is sized to snugly fit within a tubular projection 65 of connector 62. Once a member 22 is inserted into the projection 65 of connector 62, it may be permanently fastened by adhesives, interference fit, by melting one part of the connection, or by other means known in the art. The member 22 could alternatively be inserted over the exterior of the extending tubular portion 65 of connector 62. Similar construction options can be used in appropriate circumstances for connectors 15, and for the other connectors used in storage unit 8.

FIG. 5 illustrates another means of connecting to connector 62 in which the connecting end of member 22a is tapered radially inward to form a smaller diameter distal end that can be inserted and wedged into one projection 67 of connector 62. Alternatively, the tubular projection 65 may be tapered and inserted into a uniform diameter member 22a. The tapered end could be on the upper end of a lower member 22a, or the lower end of an upper member 22a, or on ends of members 26, 30, 68 or the base 10.

Figure 6:
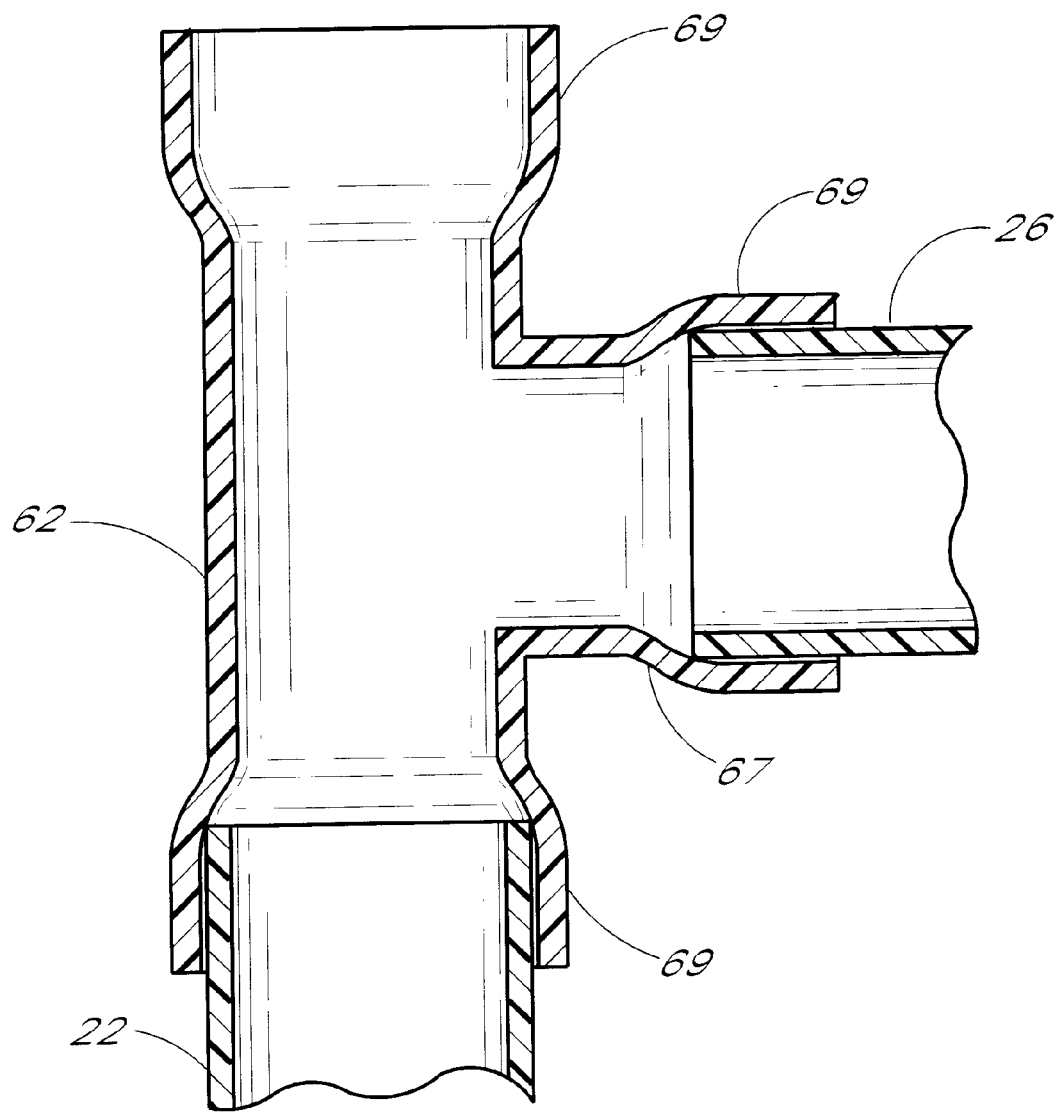
FIG. 6 is a cross sectional view of a further alternate embodiment of a connector for the storage unit of this invention.

FIG. 6 shows an alternative configuration for the connector 62 in which the distal ends forming the various opening of the connector are belled or flared radially outward to form enlarged distal portions 69 that are slightly larger in diameter than the ends of the members or supports 22, 26, 30 etc. that will be inserted into the openings of the connector. The entire connector 62 is not radially enlarged as are the distal portions 69, and thus form smaller diameters that limit the insertion of the supports 22, 26 or other members into the connector 62.

FIGS. 7–9 show a further embodiment of a connector 62 that allows the various supports to be releasably connected. This embodiment is particularly useful for releasably connecting the generally horizontal support members, such as supports 26, 30, to the vertical support members such as supports 22. But the releasable aspects can be used for any of the connectors where it is advantageous to remove one of the members or supports as desired. For ease of reference, this embodiment will be described as a variation of connector 62, it being understood the principles can be applied to other connections in this invention.

The connector 62' comprises a "T" shaped pipe fitting with a portion of the tube cut away to allow a support member to be removably inserted into the cut-away portion. Thus, the connector 62' has a tubular portion 78 forming the top of the "T" shaped connector, with ends of members 22 connecting to the opposing ends of this tubular portion 78. A tubular projection 80 extends orthogonal to the longitudinal axis of the portion 78. This tubular projection 80 forms the base of the "T" shaped connector, and has a longitudinal axis. The upper portion of projection 80 is cut away to form a curved, semi-circular projection with an opening 82 into which is removably inserted one end of supports such as support 26 or 30. The interior diameter of projection 80 is the about the same as, or slightly greater than, the exterior diameter of the end of the support 26, 30 inserted through slot 82 into the projection 80. As seen best in FIG. 8, the cut forming slot 82 is preferably formed above the centerline of the longitudinal axis of the projection 80 by a distance "y", so that the width of opening 82 is slightly smaller than the exterior diameter of the support inserted into the opening 82. Thus, the curved walls of the projection 80 can expand to allow supports such as support member 26 or 30 to be inserted into the opening 82 and projection 80, while resiliently gripping the support member 26 or 30 to inhibit accidental removal of the support member. Thus, the support member 26 or 30 rests on the projection 80, and is releasably held there by the curved walls of the projection 80.

Yet another embodiment for attaching the general supports, such as supports 26, 30 to the vertical supports 22 is shown in FIG. 10. This connector 90 comprises a tubular connector 90 with ends adapted to connect to members 22, as described herein. Extending outward from one side of the connector 90 is a projection 92, with one of the supports 26, 30 resting on the projection 92. The projection 92 is preferably shaped to conform to the shape of the portion of the support 26, 30 engaging the projection 92. As shown in FIG. 10, the projection 92 is curved to form a flat, hook-like projection when the support 26 is tubular.

The projections 80, 92 allow the supports 26, 30 to be removed from the storage unit 8. This in turn allows the container 34 to be removed. The supports 26, 30 may then be removed from the container, and the container cleaned or washed. There is thus provided means for removably connecting the flexible container to the storage unit 8.

Figure 11:
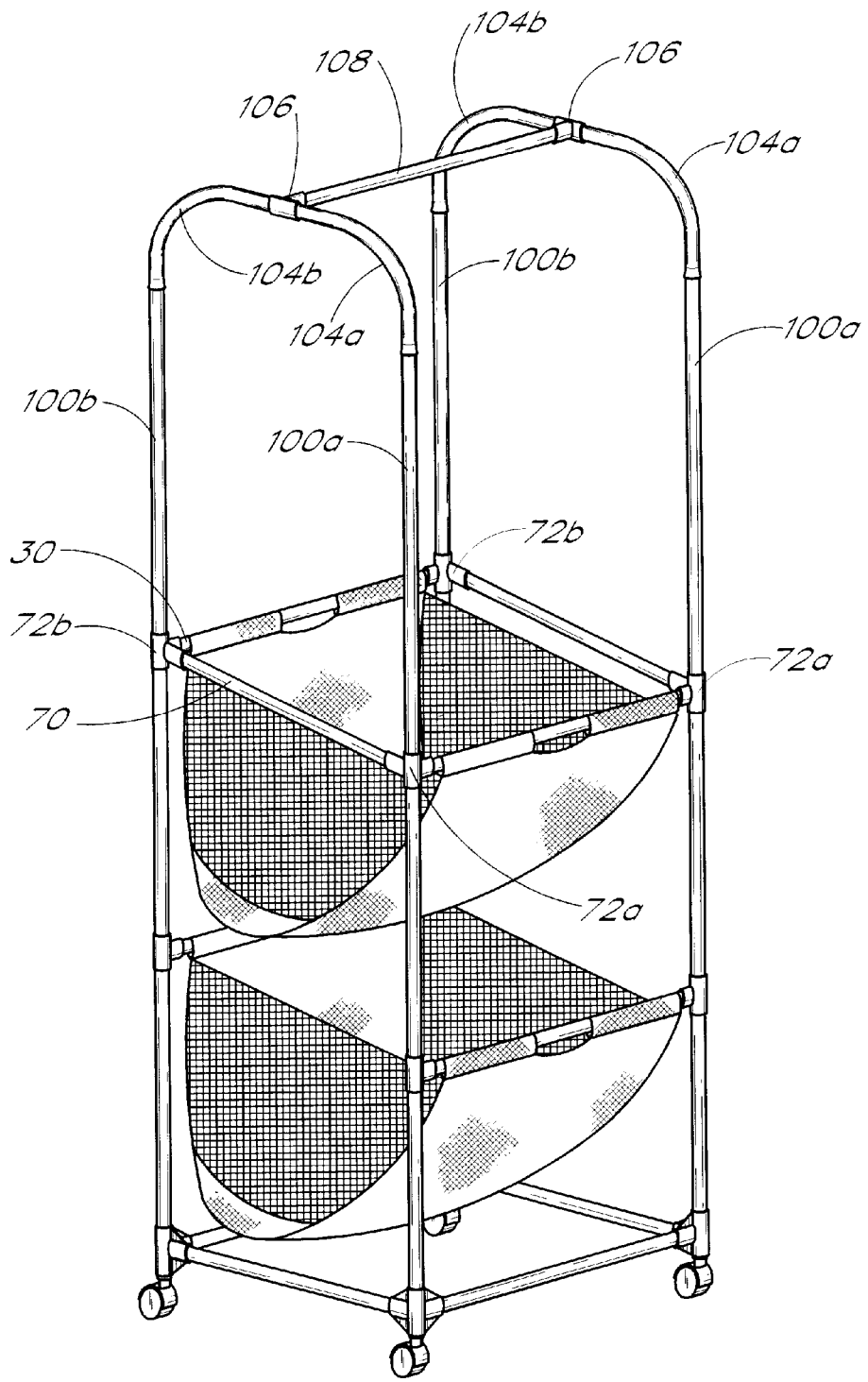
FIG. 11 is a perspective view of a storage unit of this invention having a clothes bar.

Referring to FIG. 11, a clothes hanger may also be added to the storage unit 8. Two front and two rear vertical support members 100a, 100b, respectively, are connected to the top of a storage module 21 by connectors, such as connectors 72, 76 as previously described in FIG. 1B. The front vertical supports 100a are longer than the rear vertical supports 100b so that the top or distal ends of the supports 100a, 100b are the same height. Front and rear curved members 104a, 104b, respectively, each have a first end connected to the top end of one of the supports 100a, 100b, with a second, opposing end connected to opposing arms on a "T" shaped connector 106. There are two connectors 106, one on opposing sides of the storage unit 8. The legs of each "T" shaped connector 106 face each other. A cross-bar, or clothes bar 108 connects to the leg of each "T" shaped connector 106. If desired, the "T" shaped connector 106 could comprise the releasable connector 62' described relative to FIGS. 7–9.

Figure 12:
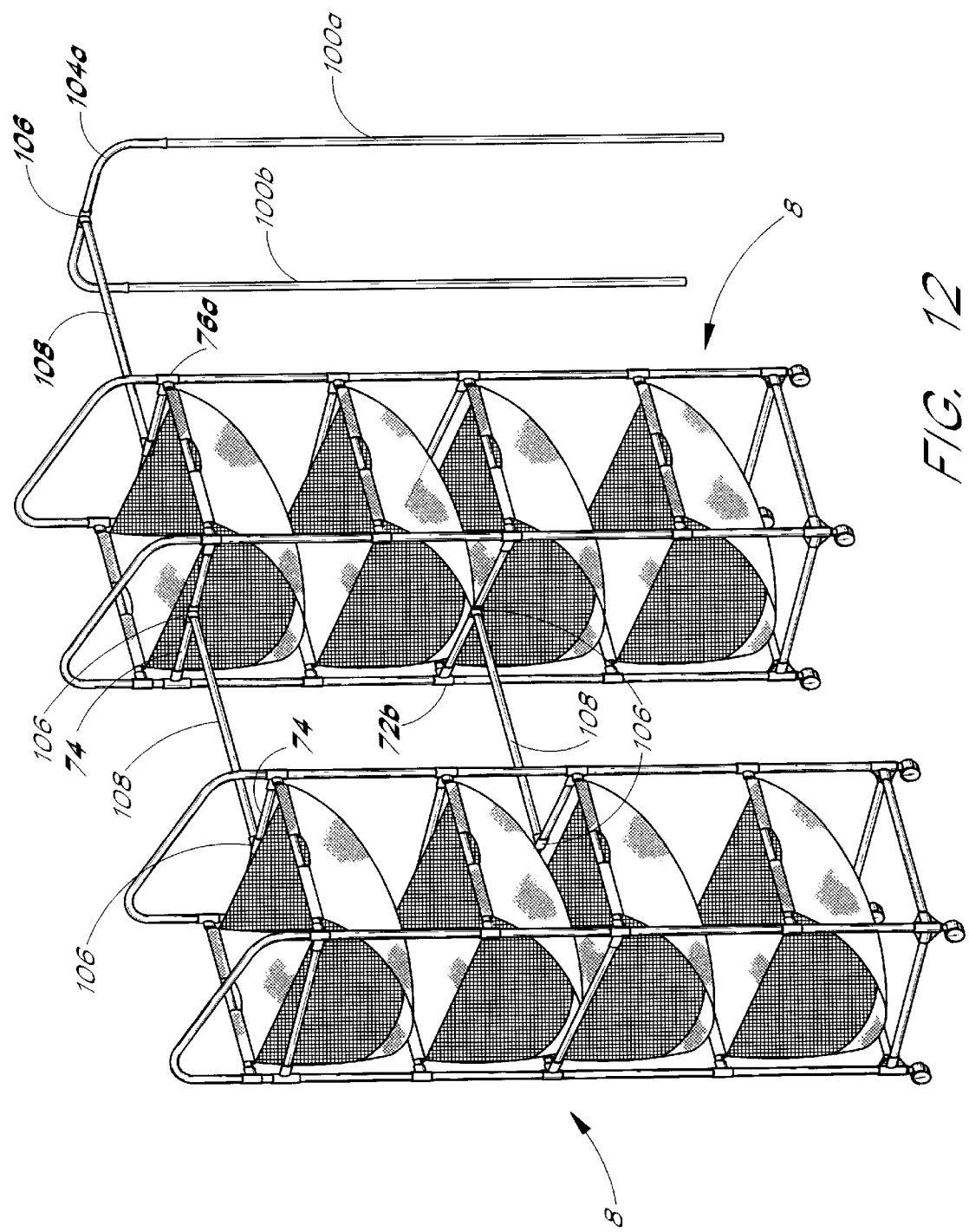
FIG. 12 is a perspective view of a plurality of storage units, clothes bars and storage modules of this invention.

The storage unit 8 can comprise various sizes and numbers of storage modules 21. Further, the storage modules 21 and clothes bar 108 can be arranged in various combinations to suit the particular needs of the user. For example, two storage units 8, each comprised of four storage modules 21 may be spaced laterally apart with one or more clothes bars 108 supported between them, as shown in FIG. 12. A "T" shaped connector 106 is shown as being connected toward the middle of inclined side bar 70 mounted to a storage unit 8. The connector 106 (or connector 62') could also be connected to the middle of the horizontal side bar 74 (FIG. 1B) to support a clothes bar 108 as shown in FIG. 12. If desired, one end of the bar 108 could be supported on module 8, with the other end directly supported off the floor by extending the length of supports 100a, 10b, as shown in FIG. 12.

The ability to vary the size and number of vertically stackable storage modules 21 provides great space savings and versatility. The ability to vary the size of the PVC tubing to accommodate the strength needed for various uses also provides great versatility in meeting the needs of users. The use of commonly configured and interchangeable connectors wherever possible also improves versatility in configuring storage units to meet the needs of users. The ability to change the size of the storage modules by cutting the length of the various supports and members further improves versatility. There is thus provided a means for readily combining a number of storage modules 21 and clothes bars 108 to achieve a wide variety of sizes and configurations to suit the needs of an individual.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A storage unit, comprising:
   a first frame having a first and second, generally horizontal and parallel supports spaced a distance apart in a horizontal plane and offset a distant in the vertical plane so the first support is lower than the second support, and a first flexible panel extending between the first and second support to form a first container which extend below the horizontal planes of the first and second support items on the flexible panel, the first frame having corners with a connector at each corner configured to engage second frame in a vertically stackable configuration.

2. The storage unit of claim 1 wherein the container has a bottom and sides, with the bottom of the container being smaller than the distance by which the generally parallel supports are spaced apart in the horizontal plane.

3. The storage unit of claim 1 further comprising a second frame having third and fourth, generally parallel supports spaced a distance apart in a horizontal plane and offset a distance in a vertical plane so the third support is lower than the fourth support, and a second flexible panel extending between the third and fourth supports to form a second container, the second frame resting on the top of the first container.

4. The storage unit of claim 3 wherein at least one of the supports for the containers is removably mounted to its frame so the flexible container can be removed for cleaning.

5. The storage unit of claim 4 wherein the first frame is rollably supported on wheels.

6. A stackable storage unit, comprising:
   first frame means for supporting a first container between a and second support that are offset in the vertical direction to allow access for the container, the first and second support being separately removable from the frame means; and
   second frame means for supporting a second container between a third and fourth support that are offset in the vertical direction to allow access to the second container, the second frame means being located above, and connected to and supported by the first frame means.

7. The storage unit of claim 6 wherein at least one of the first or second container is flexible and removably mounted to its respective frame means.

8. The storage unit of claim 6 wherein the first frame means further comprises means for rolling the first and second frame means.

9. A stackable storage unit, comprising:
   a quadrilateral base connected to generally rectangular, tubular first frame having first and second, generally parallel and horizontal supports spaced a distance apart in horizontal plane and offset a distance in a vertical plane so the first support is lower than the second support, and a first flexible panel contacted to and extending between the fist and second supports to form a fist container that extends toward the base and below the fist and second supports, the quadrilateral having four corners configured to engage a second frame in a vertically stackable configuration and one of the supports being removable from the fist frame separately from the other of the supports.

10. The storage unit of claim 9 wherein the container has sides.

11. The storage unit of claim 9 further comprising a second frame having third and fourth, generally parallel supports spaced a distance apart in a horizontal plane and offset a distance in a vertical plane so the third support is lower than the fourth support, and a second flexible panel extending between the third and fourth supports to form a second container, the second frame resting on the top of the first container.

12. The storage unit of claim 11 wherein the second container has sides and has a top and bottom with the top larger than the bottom.

13. The storage unit of claim 11 wherein the first frame is rollably supported on wheels.

14. A modular, stacking storage unit, comprising:
   a base to which is connected a first stackable module comprising a rectangular frame with vertical members at each corner with a front support extending between two of the members and a rear support extending between two other members, the front and rear supports being removabley connected to the corners so as to allow removal of each of the front and rear supports separately form the other of the supports, the front support being vertically lower than the rear support, and a panel separate from the front and rear supports and connected to but separable from the front and rear supports to form a container, the amount by which the front support is lower than the rear support being selected to allow access to the container.

15. A storage unit as defined in claim 14, further comprising;
a second stackable module with front and rear supports and a rectangular frame constructed as in the first stackable container, and a connector interposed between each of the corresponding members of the first and second stackable containers, a second flexible panel being connected to the front and rear supports of the second stackable container to form a second container, the frame of the second stackable module being configured so the second container does not block access to the first container.

16. A storage unit as defined in claim 14, wherein there are a plurality of the stackable containers stacked vertically with connectors at a plurality of the members connecting the storage unit, and wherein the amount by which the front support is lower than the rear support is selected to allow access to the stacked containers.

17. The storage unit of claim 15, further comprising a clothes bar mounted to a member connected to the frame.

18. The storage unit of claim 16, wherein the base is rollably supported on wheels.

19. A method for stacking storage containers, comprising the steps of:
forming a first support frame that supports a front and rear member that are generally horizontal, with the front member being vertically lower than the rear member, the front and rear members being separately removable from the frame;
supporting a removable and flexible fist container between the front and rear members so the front and rear members may form the frame when the container is remove, with the vertical distance between the front and rear members being selected to allow suitable access to the first container when another flexible storage container is stacked on top of the first support frame.

20. A method as defined in claim 19, comprising the further steps of:
forming a second support frame that supports a second front and second rear member that are generally horizontal, with the second front member being vertically lower than the second rear member;
supporting a second container between the second front and second rear members, with the vertical distance between the second front and second rear members being selected to allow suitable access to the second container when another storage container is stacked on top of the second support frame; and
placing the second frame above the first frame and connecting the frames to form a self-supporting storage unit.

21. A method as defined in claim 19, comprising the further steps of mounting the support frame on wheels.

22. A method as defined in claim 19, comprising the further steps of making the container of flexible material.

23. A method as defined in claim 19, comprising the further steps of forming the container of flexible material and mounting the container to support members that are removably connected to the support frame so the container can be removed for cleaning.

24. A method as defined in claim 19, comprising the further steps of connecting one end of a clothes bar to the frame and supporting the other end of the bar so the bar is in a generally horizontal position.

25. A method as defined in claim 23, comprising the further steps of connecting one end of a clothes bar to the frame and supporting the other end of the bar so the bar is in a generally horizontal position.

26. A storage unit, comprising:
a first frame having a first and second, generally parallel supports spaced a distance apart in a horizontal plane and offset a distance in the vertical plane so the first support is lower than the second support, and a first flexible panel extending between the first and second supports to form a first container; and
a second frame having third and fourth, generally parallel supports spaced a distance apart in a horizontal plane and offset a distance in the vertical plane so the third support is lower than the fourth support, and a second flexible panel extending between the third and fourth supports to form a second container, the second frame resting on the top of the first container.

27. The storage unit of claim 26, wherein at least one of the supports for the containers is removably mounted to its frame so the flexible container can be removed for cleaning.

28. The storage unit of claim 26, wherein the first frame is rollably supported on wheels.

29. A stackable storage unit comprising:
a quadrilateral base connected to a generally rectangular, tubular first frame having first and second, generally parallel supports spaced a distance apart in a horizontal plane and offset a distance in a vertical plane so the first support is lower than the second support, and a first flexible panel extending between the first and second supports to form a first container; and a second frame having generally parallel supports spaced a distance apart in the horizontal plane and offset a distance in the vertical plane so the third support is lower than the fourth support, and a second flexible panel extending between the third and fourth supports to form a second container, the second frame resting on the top of the first container.

30. The storage unit of claim 29, wherein the second container has sides and has a top and bottom with the top larger than the bottom.

31. The storage unit of claim 29, wherein the first frame is rollably supported on wheels.

32. A method for stacking storage containers, comprising the steps of:
forming a first support frame that supports a front and rear member that are generally horizontal, with the front member being vertically lower than the rear member, the first support frame having connectors configured to stack a second frame vertically above the fist support frame;
supporting a first container between the front and rear members, with the vertical distance between the front and rear members being selected to allow suitable access to the first container when another storage container is stacked on top of the first support frame, making the container of flexible material; and
connecting a second support from to the connectors to form a second support frame vertically above the first support frame, the second support frame supporting a front and rear member that are generally horizontal with a second container supported between them.

33. A method as defined in claim 32, comprising the further step of forming and mounting at least the first container to support member that are removably connected to their respective support frame so the support members can be removed separately from each other so the container supported by the members can be removed for cleaning.

* * * * *